United States Patent
Schulze et al.

(10) Patent No.: US 10,402,447 B1
(45) Date of Patent: *Sep. 3, 2019

(54) REMOTE DOCUMENT RETRIEVAL AND STORAGE SYSTEM

(71) Applicant: Mirror Imaging L.L.C., Warren, MI (US)

(72) Inventors: Michael D. Schulze, Troy, MI (US); Richard J. Gagnon, Grosse Pointe Park, MI (US)

(73) Assignee: MIRROR IMAGING L.L.C., Warren, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,008

(22) Filed: Mar. 5, 2019

Related U.S. Application Data

(63) Continuation of application No. 15/990,160, filed on May 25, 2018, now Pat. No. 10,262,009, which is a
(Continued)

(51) Int. Cl.
*G06F 17/30* (2006.01)
*G06F 16/583* (2019.01)
(Continued)

(52) U.S. Cl.
CPC ........ *G06F 16/583* (2019.01); *G06F 16/2308* (2019.01); *G06F 16/2453* (2019.01);
(Continued)

(58) Field of Classification Search
CPC ............. G06F 16/583; G06F 16/24562; G06F 16/2308; G06F 16/93; G06F 16/2453;
(Continued)

(56) References Cited

U.S. PATENT DOCUMENTS

| | | |
|---|---|---|
| 3,872,448 A | 3/1975 | Mitchell, Jr. |
| 4,817,050 A | 3/1989 | Komatsu et al. |

(Continued)

FOREIGN PATENT DOCUMENTS

| | | |
|---|---|---|
| EP | 0273435 A2 | 6/1988 |
| EP | 0534398 A2 | 9/1992 |

OTHER PUBLICATIONS

D' Alleyrand, Handbook of Image Storage and Retrieval Systems, Multiscience Press, Inc. (1992). pp. 4-5.
(Continued)

*Primary Examiner* — Pierre M Vital
*Assistant Examiner* — Andalib F Lodhi
(74) *Attorney, Agent, or Firm* — Reising Ethington, P.C.; Shannon Smith

(57) ABSTRACT

An electronically stored financial document is either maintained in a first storage system when a parameter associated with the document is greater than a pre-selected parameter or in a second storage system when the parameter associated with the document is less than or equal to the pre-selected parameter. A request for a stored financial document is received and the requested financial document parameter is compared by the at least one electronic processor to the pre-selected financial document parameter to determine if the electronically stored financial document's parameter is more than, less than, or equal to the pre-selected parameter after the request is received. By using an interlinked interface, at least one electronic processor compares and electronically accesses one of the storage systems in response to the comparison of the pre-selected parameter to the electronically stored financial document's parameters. After accessing the appropriate storage system, the requested electronically stored financial document can be reproduced, and/or distributed.

29 Claims, 4 Drawing Sheets

Related U.S. Application Data continuation of application No. 15/904,565, filed on Feb. 26, 2018, now Pat. No. 10,013,435, which is a continuation of application No. 14/857,854, filed on Sep. 18, 2015, now Pat. No. 9,928,275, which is a continuation of application No. 13/840,892, filed on Mar. 15, 2013, now Pat. No. 9,141,612, which is a continuation of application No. 13/727,936, filed on Oct. 13, 2011, now abandoned, which is a continuation of application No. 12/902,973, filed on Oct. 12, 2010, now abandoned, which is a continuation of application No. 12/489,087, filed on Jun. 22, 2009, now Pat. No. 7,836,067, which is a continuation of application No. 11/202,790, filed on Aug. 12, 2005, now Pat. No. 7,552,118, which is a continuation of application No. 10/104,541, filed on Mar. 22, 2002, now Pat. No. 6,963,866, which is a continuation of application No. 09/548,490, filed on Apr. 13, 2000, now Pat. No. 6,446,072.

(60) Provisional application No. 60/129,021, filed on Apr. 13, 1999.

(51) Int. Cl.
*G06F 16/2453* (2019.01)
*G06Q 40/00* (2012.01)
*G06F 16/93* (2019.01)
*G06F 16/58* (2019.01)
*G06F 16/23* (2019.01)
*G06F 16/2455* (2019.01)
*G06F 16/44* (2019.01)
*G06Q 40/02* (2012.01)
*G06F 16/10* (2019.01)

(52) U.S. Cl.
CPC .... *G06F 16/24562* (2019.01); *G06F 16/5866* (2019.01); *G06F 16/93* (2019.01); *G06Q 40/00* (2013.01); *G06F 16/10* (2019.01); *G06F 16/447* (2019.01); *G06Q 40/02* (2013.01)

(58) Field of Classification Search
CPC .... G06F 16/5866; G06F 16/10; G06F 16/447; G06Q 40/00; G06Q 40/02
USPC ......................................................... 707/769
See application file for complete search history.

(56) References Cited

U.S. PATENT DOCUMENTS

| | | |
|---|---|---|
| 4,888,812 A | 12/1989 | Dinan et al. |
| 4,899,299 A | 2/1990 | MacPhail |
| 4,941,125 A | 6/1990 | Boyne |
| 5,029,016 A | 7/1991 | Hiyama et al. |
| 5,058,185 A | 10/1991 | Morris et al. |
| 5,097,517 A | 3/1992 | Holt |
| 5,109,439 A | 4/1992 | Froessl |
| 5,153,936 A | 10/1992 | Morris et al. |
| 5,170,466 A | 12/1992 | Rogan et al. |
| 5,187,750 A | 2/1993 | Behera |
| 5,218,685 A | 6/1993 | Jones |
| 5,247,660 A | 9/1993 | Ashcraft et al. |
| 5,287,497 A | 2/1994 | Behera |
| 5,301,350 A | 4/1994 | Rogan et al. |
| 5,305,196 A | 4/1994 | Deaton et al. |
| 5,321,816 A | 6/1994 | Rogan et al. |
| 5,325,511 A | 6/1994 | Collins et al. |
| 5,339,311 A | 8/1994 | Turner |
| 5,361,255 A | 11/1994 | Diaz et al. |
| 5,373,550 A | 12/1994 | Campbell et al. |
| 5,384,835 A | 1/1995 | Wheeler et al. |
| 5,506,986 A | 4/1996 | Healy |
| 5,530,899 A | 6/1996 | MacDonald |
| 5,548,770 A | 6/1996 | Bridges |
| 5,550,976 A | 8/1996 | Henderson et al. |
| 5,572,726 A | 11/1996 | Hasuo |
| 5,584,008 A | 12/1996 | Shimada et al. |
| 5,592,432 A | 1/1997 | Vishlitzky et al. |
| 5,602,933 A | 2/1997 | Blackwell et al. |
| 5,602,936 A | 2/1997 | Green et al. |
| 5,649,196 A | 7/1997 | Woodhill et al. |
| 5,678,042 A | 10/1997 | Pisello et al. |
| 5,678,046 A | 10/1997 | Cahill et al. |
| 5,706,457 A | 1/1998 | Dwyer |
| 5,727,164 A | 3/1998 | Keye et al. |
| 5,732,214 A | 3/1998 | Subrahmanyam |
| 5,742,792 A | 4/1998 | Yanai et al. |
| 5,742,807 A | 4/1998 | Masinter |
| 5,751,993 A | 5/1998 | Ofek et al. |
| 5,783,808 A | 7/1998 | Josephson |
| 5,784,610 A | 7/1998 | Copeland, III et al. |
| 5,787,403 A | 7/1998 | Randle |
| 5,806,078 A | 9/1998 | Hug et al. |
| 5,813,009 A | 9/1998 | Johnson et al. |
| 5,819,300 A | 10/1998 | Kohno et al. |
| 5,825,506 A | 10/1998 | Bednar et al. |
| 5,825,943 A | 10/1998 | DeVio et al. |
| 5,860,066 A | 1/1999 | Rouse |
| 5,870,725 A | 2/1999 | Bellinger et al. |
| 5,895,455 A | 4/1999 | Bellinger et al. |
| 5,897,643 A | 4/1999 | Matsumoto |
| 5,901,228 A | 5/1999 | Crawford |
| 5,910,988 A | 6/1999 | Ballard |
| 5,917,958 A | 6/1999 | Nunally et al. |
| 5,924,074 A | 7/1999 | Evans |
| 5,926,288 A | 7/1999 | Dellert et al. |
| 5,926,623 A | 7/1999 | Tsukakoshi et al. |
| 5,940,844 A | 8/1999 | Cahill et al. |
| 5,949,492 A | 9/1999 | Mankovitz |
| 5,953,729 A | 9/1999 | Cabrera et al. |
| 6,023,710 A | 2/2000 | Steiner et al. |
| 6,029,175 A | 2/2000 | Chow et al. |
| 6,061,686 A | 5/2000 | Gauvin et al. |
| 6,065,026 A | 5/2000 | Cornelia et al. |
| 6,081,251 A | 6/2000 | Sakai et al. |
| 6,097,834 A | 8/2000 | Krouse et al. |
| 6,115,509 A | 9/2000 | Yeskel |
| 6,124,878 A | 9/2000 | Adams et al. |
| 6,157,930 A | 12/2000 | Ballard et al. |
| 6,157,931 A | 12/2000 | Cane et al. |
| 6,181,837 B1 | 1/2001 | Cahill et al. |
| 6,192,165 B1 | 2/2001 | Irons |
| 6,212,303 B1 | 4/2001 | Doran et al. |
| 6,236,767 B1 | 5/2001 | Altman |
| 6,246,778 B1 | 6/2001 | Moore |
| 6,269,380 B1 | 7/2001 | Terry et al. |
| 6,269,382 B1 | 7/2001 | Cabrera et al. |
| 6,308,179 B1 | 10/2001 | Petersen et al. |
| 6,321,258 B1 | 11/2001 | Stollfus et al. |
| 6,349,330 B1 | 2/2002 | Bemadett et al. |
| 6,349,373 B2 | 2/2002 | Sitka |
| 6,360,306 B1 | 3/2002 | Bergsten |
| 6,366,930 B1 | 4/2002 | Parker et al. |
| 6,446,072 B1 | 9/2002 | Schulze et al. |
| 6,557,039 B1 | 4/2003 | Leong et al. |
| 6,574,629 B1 | 6/2003 | Cooke, Jr. et al. |
| 6,584,466 B1 | 6/2003 | Serbinis et al. |
| 6,820,094 B1 | 11/2004 | Ferguson et al. |
| 6,886,047 B2 | 4/2005 | Leong et al. |
| 7,836,067 B2 | 11/2010 | Schulze et al. |
| 9,141,612 B2 | 3/2015 | Schulze et al. |

OTHER PUBLICATIONS

D'Alleyrand, Networks and Imaging Systems in a Windowed Environment, Artech House, Inc. (1996). pp. 21, 176, 184, 221, 235, 237, 294, 319-336, 338-339.

D'Alleyrand, Image Storage and Retrieval Systems, Intertext Publications, McGraw-Hill Book Co. (1989). p. 30.

(56) References Cited

OTHER PUBLICATIONS

Green, Introduction to Electronic Document Management Systems, Academic Press, Inc. (1993). pp. 1-2, 17, 110-111, 115-116, 121-122, 128, 147-148, VIII.D.
Muller, Computerized Document Imaging Systems, Artech House, Inc. (1993). pp. 4-5, 40, 100, 107-188, xvi.
Robek, Information and Records Management, Glencoe/McGraw-Hill (4th ed. 1995). pp. 157, 217, 300-301, 335-336, 514, 580, 580, 582, 586.
Sutton, Document Management for the Enterprise, Wiley Computer Publishing, John Wiley & Sons, Inc. (1996). pp. 25, 43, 133, 137, 179-181, 202-203, 214-216.
Gray, Expert Report, CBM2017-00065. pp. 1-95.
Business Records Storage and Management, Iron Mountain, available at http://web.archive.org/web/19990428181241/http://www.ironmountain.com:80:IRONBRSM.HTM.
Iron Mountain Home Page, Iron Mountain, available at http://web.archive.org/web/19990221212628/http://www.ironmountain.com/90:ironmtn.htm.
SafeKeeper, Iron Mountain, available at http://web.archive.org/web/19990428211554/http://www.ironmountain.com:90/IRONSP.HTM.
Hudson, Finding Your Ancestors at the Troy Public Library (Feb. 1993).
Online Computer Library Center ("OCLC"), Together We Make Breakthroughs Possible, available at http://www.oclc.org/en/about.html.
Society of American Archivists, microfiche, available at https://www2.archivists.org/glossary/terms/m/microfiche.
Online Computer Library Center ("OCLC"), Dewey Decimal Classification summaries, available at https://www.oclc.org/en/dewey/features/summaries.html.
Online Computer Library Center ("OCLC"), Furthering Access to the World's Information for 30 Years, (1997).
Systems Analysis of Medical Records in Georgia, Georgia Institute of Technology and Westinghouse Electric Corporation, vol. 1, Sep. 1971.
Declaration of William R. Michalson, CBM2018-00015 for U.S. Pat. No. 9,141,612 (Jan. 11, 2018).
Declaration of William R. Michalson, CBM2018-00016 for U.S. Pat. No. 7,836,067 (Jan. 9, 2018).
Declaration of William R. Michalson, CBM2018-00017 for U.S. Pat. No. 7,552,118 (Jan. 10, 2018).
Declaration of William R. Michalson, CBM2018-00014 for U.S. Pat. No. 6,963,866 (Jan. 11, 2018).
Declaration of John V. Ashley, CBM2017-00066 for U.S. Pat. No. 7,836,067 (Jul. 26, 2018).
Declaration of John V. Ashley, CBM2017-00065 for U.S. Pat. No. 7,552,118 (Jul. 26, 2018).
Declaration of John V. Ashley, CBM2017-00064 for U.S. Pat. No. 6,963,866 (Jul. 26, 2018).
Deposition of Stephen Gray, CBM2017-00064; CBM2017-00065; CBM2017-00066; CBM2017-00067 for U.S. Pat. No. 5,963,866 (Jul. 12, 2018).
Declaration of John V. Ashley, CBM2017-00067 for U.S. Pat. No. 9,141,612 (Jul. 26, 2018).
Declaration of Stephen Gray, FIS Exhibit 1007 for U.S. Pat. No. 7,836,067 (Oct. 4, 2017).
Declaration of Stephen Gray, FIS Exhibit 1007 for U.S. Pat. No. 9,141,612 (Oct. 5, 2017).
Declaration of Stephen Gray, FIS Exhibit 1007 for U.S. Pat. No. 6,963,866 (Sep. 30, 2017).
Rudolf F. Graf, Modern Dictionary of Electronics—Seventh Edition, p. 453 (1999).
United States District Court, Claim Construction Ruling for U.S. Pat. No. 6,446,072, FIS Exhibit 1024, p. 21 (Feb. 26, 2004).
Joint Proposed Redacted Institution Decision, Case-CBM2017-00066 for U.S. Pat. No. 7,836,067.
Order Denying Institution of Covered Business Method Patent Review;Case CBM2018-00014 for U.S. Pat. No. 5,963,866
Order Denying Institution of Covered Business Method Patent Review 35 U.S.C. § 324(a), Case CBM2018-00015 for U.S. Pat. No. 9,141,612
Order Denying Institution of Covered Business Method Patent Review 35 U.S.C. § 324(a), Case CBM2018-00016 for U.S. Pat. No. 7,836,067
Order Denying Institution of Covered Business Method Patent Review 35 U.S.C. § 324(a); Case CBM2018-00017 for U.S. Pat. No. 7,552,118.
Joint Proposed Redacted Institution Decision; Case CBM2017-00065 for U.S. Pat. No. 7,552,118.
Joint Proposed Redacted Institution Decision; Case CBM2017-00067 for U.S. Pat. No. 9,141,612.
Joint Proposed Redacted Institution Decision; Case CBM2017-00064 for U.S. Pat. No. 6,963,866.
Record of Oral Hearing, Held: Jan. 15, 2019; Case CBM2017-00064 for U.S. Pat. No. 6,963,866; case CBM2017-00065 for U.S. Pat. No. 7,552,118; Case CBM2017-00066 for U.S. Pat. No. 7,836,067; case CBM2017-00067 for U.S. Pat. No. 9,141,612.
Petitioner's Brief Regarding 2019 Revised Subject Matter Eligibility Guidance 84 Fed. Reg. 50 (Jan. 7, 2019); Case CBM2017-00065 for U.S. Pat. No. 7,552,118.
Petitioner's Brief Regarding 2019 Revised Subject Matter Eligibility Guidance 84 Fed. Reg. 50 (Jan. 7, 2019); Case CBM2017-00066 for U.S. Pat. No. 7,836,067.
Petitioner's Brief Regarding 2019 Revised Subject Matter Eligibility Guidance 84 Fed. Reg. 50 (Jan. 7, 2019); Case CBM2017-00067 for U.S. Pat. No. 9,141,612.
Mirror Imaging's Supplemental Brief Regarding the Guidance (Jan. 12, 2019); Case CBM2017-00066 for U.S. Pat. No. 7,836,067.
Mirror Imaging's Supplemental Brief Regarding the Guidance (Jan. 12, 2019); Case CBM2017-00065 for U.S. Pat. No. 7,552,118.
Mirror Imaging's Supplemental Brief Regarding the Guidance (Jan. 12, 2019); Case CBM2017-00067 for U.S. Pat. No. 9,141,612.
Mirror Imaging's Supplemental Brief Regarding the Guidance (Jan. 12, 2019); Case CBM2017-00064 for U.S. Pat. No. 6,963,866.
Petitioner's Brief Regarding 2019 Revised Subject Matter Eligibility Guidance 84 Fed. Reg. 50 (Jan. 7, 2019); Case CBM2017-00064 for U.S Pat. No. 6,963,866.
Joint Proposed Redacted Final Written Decision for U.S. Pat. No. 9,141,612 dated Apr. 22, 2019; 67 pages.
Joint Proposed Redacted Final Written Decision for U.S. Pat. No. 7,836,067 dated Apr. 22, 2019; 67 pages.
Joint Proposed Redacted Final Written Decision for U.S. Pat. No. 7,552,118 dated Apr. 22, 2019; 67 pages.
Joint Proposed Redacted Final Written Decision for U.S. Pat. No. 6,963,866 dated Apr. 22, 2019; 71 pages.

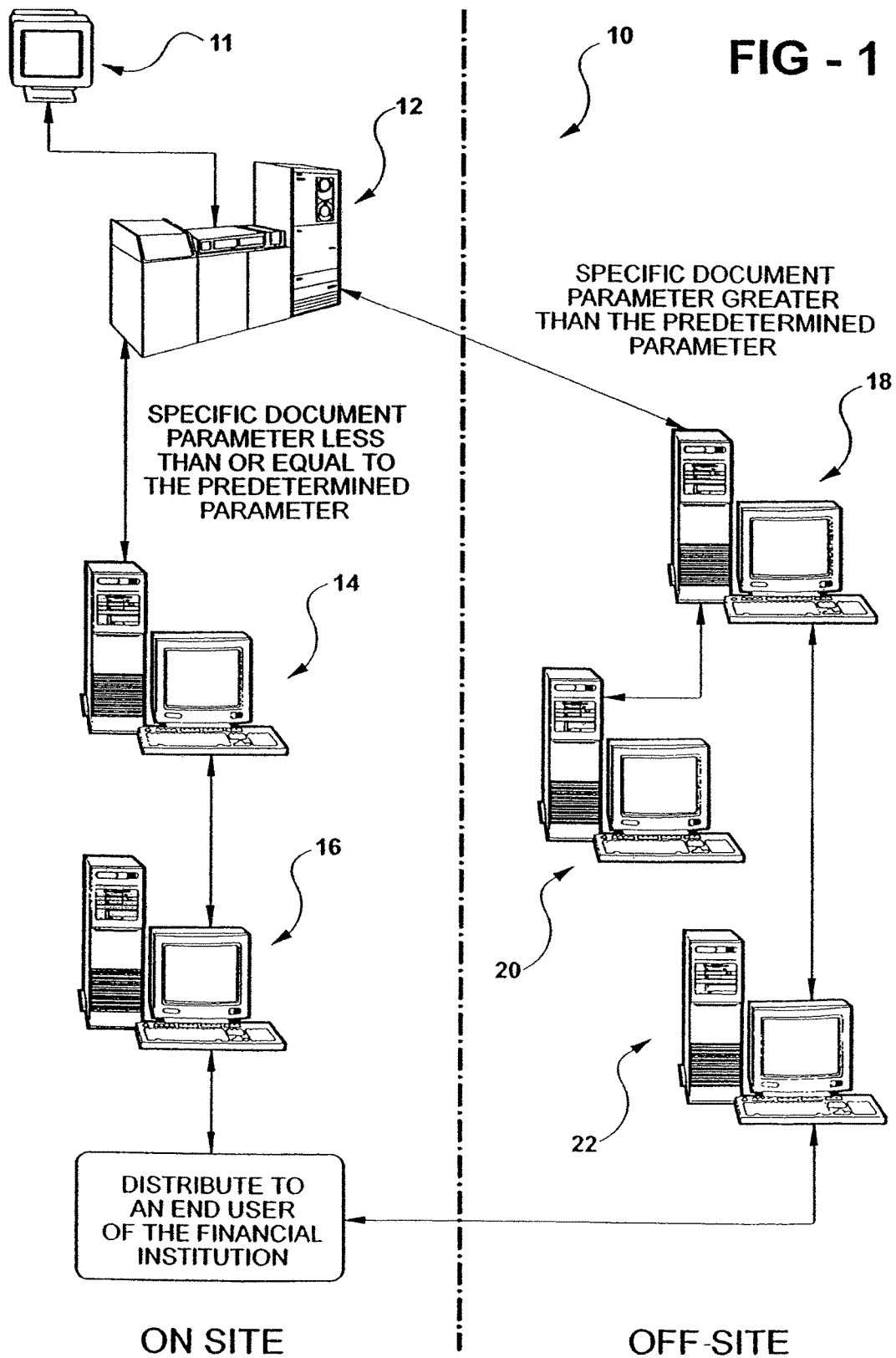

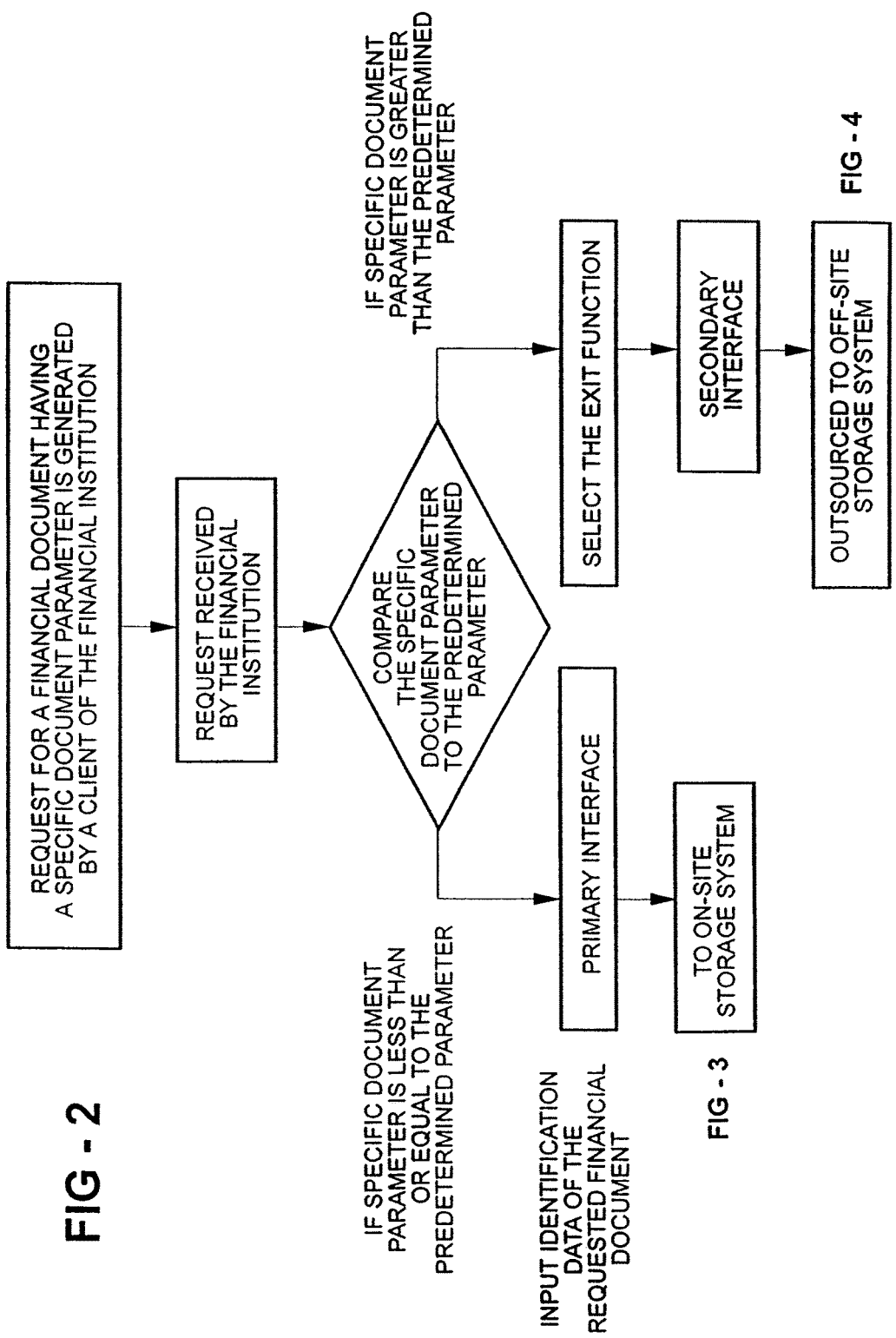

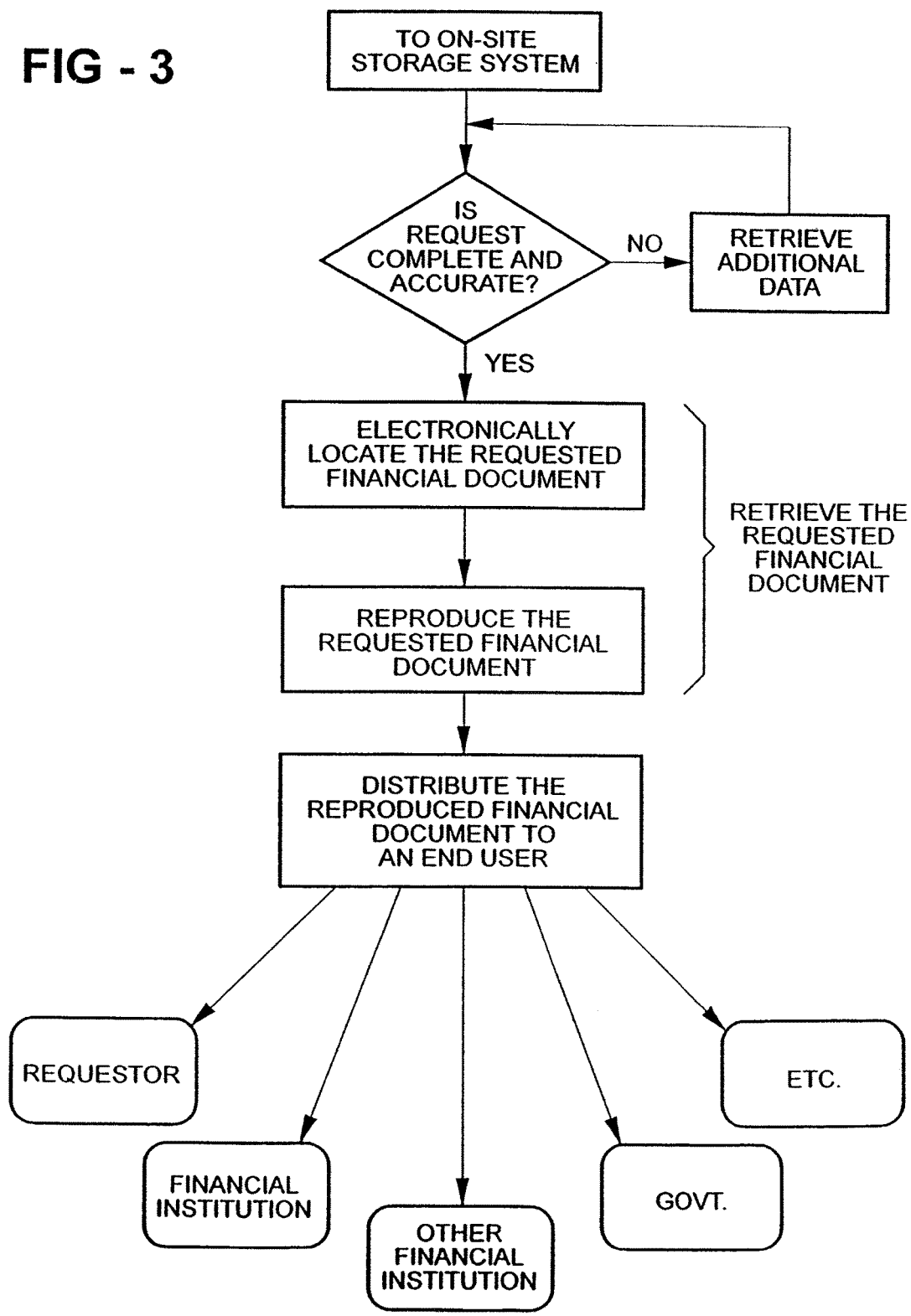

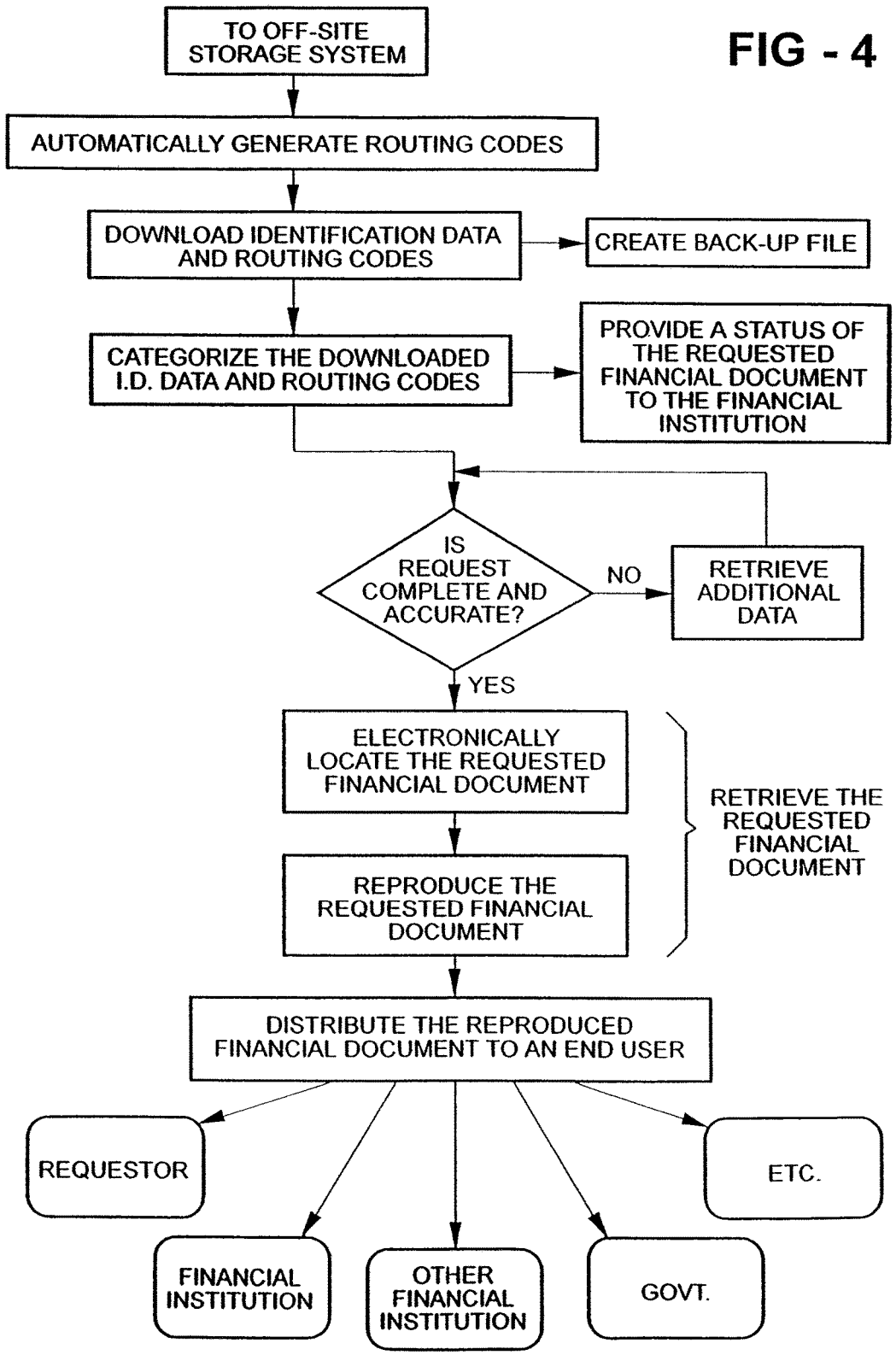

REMOTE DOCUMENT RETRIEVAL AND STORAGE SYSTEM

RELATED APPLICATIONS

This patent application is a continuation of U.S. patent application Ser. No. 15/990,160 filed on May 25, 2018, which is a continuation of U.S. patent application Ser. No. 15/904,565 filed on Feb. 26, 2018, which is a continuation of U.S. patent application Ser. No. 14/857,854 filed on Sep. 18, 2015, now U.S. Pat. No. 9,928,275, which is a continuation of U.S. patent application Ser. No. 13/840,892 filed on Mar. 15, 2013, now U.S. Pat. No. 9,141,612, which is a continuation of U.S. patent application Ser. No. 13/272,936 filed on Oct. 13, 2011, now abandoned, which is continuation of U.S. patent application Ser. No. 12/902,973 filed on Oct. 12, 2010, now abandoned, which is a continuation of U.S. patent application Ser. No. 12/489,087 filed on Jun. 22, 2009, now U.S. Pat. No. 7,836,067, which is a continuation of U.S. patent application Ser. No. 11/202,790 filed on Aug. 12, 2005, now U.S. Pat. No. 7,552,118, which is a continuation of U.S. patent application Ser. No. 10/104,541 filed on Mar. 22, 2002, now U.S. Pat. No. 6,963,866, which is a continuation of U.S. patent application Ser. No. 09/548,490 filed on Apr. 13, 2000, now U.S. Pat. No. 6,446,072, which in turn claims priority to and all the advantages of U.S. Provisional Patent Application Ser. No. 60/129,021, which was filed on Apr. 13, 1999, all of which being incorporated by reference herein in their entirety.

FIELD

The subject invention relates to a method for a financial institution to obtain electronically-stored financial documents from an off-site storage system remotely-located from an on-site storage system.

BACKGROUND

Methods for obtaining electronically-stored financial documents are generally known in the art. Financial institutions, such as banks and credit unions, utilize such methods to rapidly and efficiently obtain financial documents for distribution to clients upon request. Such financial documents include paid checks, account statements, and other related documents. These financial documents are typically stored on microfiche, microfilm, digitally, or by some other electronic storage means. Further, these financial documents are typically electronically-stored in an on-site storage system located at the financial institution or in an off-site storage system. Electronic storage of these financial documents permits financial institutions to eliminate storage of paper or "hard" copies of these documents. The electronic storage of these documents also provides a means of retrieving the information from the on-site and off-site storage systems.

Once the document is stored, the client may request an image of a particular stored document. Client requests are made to replace lost or stolen documents, for tax purposes, for proof of financial transactions, for legal disputes, and other similar matters. The client's request is inputted into a computer terminal at the financial institution. More specifically, conventional methods for obtaining an electronically-stored financial document enable an employee of the financial institution, such as a bank teller, to input the request into an interface incorporated into the computer terminal. The interface is inter-linked with the on-site storage system. Typically, all requests for a particular period are grouped together and subsequently downloaded for retrieval of the requested image by the financial institution. The financial institution retrieves the image, e.g. a photocopy of the check, and then distributes the photocopy to the client via facsimile, mail or hand delivery. The storing, downloading, and retrieving of the financial document, including the reproduction and the distribution of the document, are known in the industry as back office production. Back office production for financial institutions is particularly resource intensive, time consuming, and expensive. Also, back office production becomes increasingly expensive if the client requests a particularly old financial document because older financial documents frequently require more resources and time to locate and retrieve.

The majority of financial institutions electronically store financial documents only in an on-site storage system and not in an off-site storage system. Consequently, these financial institutions are unable to outsource the responsibilities for the back office production to third party entities to alleviate the expenses and resources associated with the back office production. These financial institutions realize a significant financial burden since the back office production is concentrated strictly at the financial institution.

Other financial institutions do electronically store financial documents in on-site and off-site storage systems. However, the methods utilized by these financial institutions to access the financial documents stored in the off-site storage system are deficient in that the interface utilized in such methods is only inter-linked with the on-site storage system. That is, there is no interface independently inter-linked with the off-site storage system. As a result, the financial documents stored in the off-site storage system can not be efficiently accessed. These financial institutions are still responsible for retrieving the requested financial documents through their back office production and their expenses remain high. One such method of retrieving documents from on-site and off-sited storage systems is disclosed in U.S. Pat. No. 5,784,610 to Copeland, III et al.

Due to the inefficiencies identified in the conventional methods used by financial institutions to obtain financial documents, it is desirable to implement a method for a financial institution to obtain electronically-stored financial documents from both on-site and off-site storage systems that reduces, if not eliminates, the back office production of the financial institution by providing a direct interface inter-linked with the off-site storage system. With such an interface, the responsibility for retrieving financial documents from the off-site storage can be outsourced to third party entities while still providing the financial institution with efficient access to any financial documents electronically-stored in the off-site storage system.

SUMMARY

According to one embodiment, there is provided a system for selectively storing and retrieving electronic images of a plurality of financial documents, each electronic image being associated with a document parameter that includes a numerical sequence that is representative of a record date of the corresponding financial document. The system comprises a first storage system including a first fixed medium, the first storage system being associated with a first entity and configured to: store at least some of the electronic images for the plurality of financial documents wherein the document parameter for each of the at least some of the electronic images that are configured to be stored in the first storage system are greater than a predetermined parameter, wherein the predetermined parameter is a date or time period; a second storage system including a second fixed medium, wherein the second storage system is located remotely from the first storage system, the second storage system being associated with a second entity and configured to: store at least some of the electronic images for the plurality of financial documents wherein the document parameter for each of the at least some of the electronic images configured to be stored in the second storage system are less than or equal to the predetermined parameter; an electronic processor which has electronic access to the first and second storage systems and is also interlinked to the first storage system and the second storage system, wherein the electronic processor is interlinked to the first storage system and the second storage system through an interlinked interface, wherein the electronic processor is configured to: receive a request for one of the stored electronic images of the plurality of financial documents; compare the numerical sequence of the document parameter associated with the requested stored electronic image to the predetermined parameter; automatically access the first storage system when the numerical sequence of the document parameter associated with the requested stored electronic image is greater than the predetermined parameter; automatically access the second storage system when the numerical sequence of the document parameter associated with the requested stored electronic image is less than or equal to the predetermined parameter; and automatically retrieve the requested stored electronic image from the first storage system or the second storage system once the first storage system or the second storage system has been accessed.

According to another embodiment, there is provided a method of accessing an electronically-stored financial document from one of a first storage system associated with a first entity and a second storage system associated with a second entity, wherein the second storage system is located remotely from the first storage system, wherein the first and second storage systems each include a plurality of financial documents stored therein and wherein each of the financial documents has an electronic image and is associated with at least one specific document parameter, wherein the first storage system is associated with a primary interface and the second storage system is associated with a secondary interface. The method comprises the steps of: electronically storing a plurality of images of the financial documents in a first fixed medium at the first storage system when the specific document parameter of the financial document is greater than a predetermined parameter, wherein the predetermined parameter is a numerical record date or time period; electronically storing a plurality of images of the financial documents in a second fixed medium at the second storage system when the specific document parameter of the financial document is less than or equal to the predetermined parameter; utilizing at least one electronic processor that has access to the first and second storage systems by interlinking the primary interface of the first storage system with the secondary interface of the second storage system; receiving a request for an image of one of the stored financial documents at the electronic processor; comparing the specific document parameter of the requested financial document to the predetermined parameter to determine whether the specific document parameter is greater than, less than, or equal to the predetermined parameter after the request has been received, wherein the specific document parameter of the financial document is a particular numerical sequence associated with the specific document parameter, and wherein the particular numerical sequence of the financial document includes a record date of the financial document; automatically accessing the first storage system when the specific document parameter is greater than the predetermined parameter and automatically accessing the second storage system when the specific document parameter is less than or equal to the predetermined parameter; and automatically retrieving the image of the requested financial document from the accessed storage system as defined by the received request.

According to one embodiment, there is provided a system for selectively storing and retrieving electronic images of a plurality of financial documents, each electronic image being associated with a document parameter that includes a numerical sequence that is representative of a record date of the corresponding financial document, the system comprising: a first storage system including a first fixed medium, the first storage system being associated with a first entity and configured to: store at least some of the electronic images for the plurality of financial documents, wherein the document parameter for each of the electronic images that are configured to be stored in the first storage system is greater than a predetermined parameter, wherein the predetermined parameter is a date or time period. The system further comprises a second storage system including a second fixed medium, wherein the second storage system is located remotely from the first storage system, the second storage system being associated with a second entity and configured to: store at least some of the electronic images for the plurality of financial documents, wherein the document parameter for each of the electronic images configured to be stored in the second storage system is less than or equal to the predetermined parameter. The system further comprises at least one electronic processor which has electronic access to the first and second storage systems and is also interlinked to the first storage system and the second storage system, wherein the at least one electronic processor is interlinked to the first storage system and the second storage system through an interlinked interface, wherein the at least one electronic processor is configured to: receive a request for at least one of the stored electronic images of the plurality of financial documents; automatically compare the numerical sequence of the document parameter associated with the requested stored electronic image to the predetermined parameter after the request is received; automatically access the first storage system when the numerical sequence of the document parameter associated with the requested stored electronic image is greater than the predetermined parameter; automatically access the second storage system when the numerical sequence of the document parameter associated with the requested stored electronic image is less than or equal to the predetermined parameter; and automatically retrieve the requested stored electronic image from the first storage system or the second storage system once the first storage system or the second storage system has been accessed.

According to one embodiment, there is provided a system for selectively storing and retrieving electronic images of a plurality of financial documents, each electronic image being associated with a document parameter that includes a numerical sequence that is representative of a record date of the corresponding financial document, the system comprising: a first storage system including a first fixed medium, the first storage system being associated with a first entity and configured to: store at least some of the electronic images for the plurality of financial documents, wherein the document parameter for each of the electronic images that are configured to be stored in the first storage system is greater than a predetermined parameter, wherein the predetermined parameter is a date or time period. The system further comprises a second storage system including a second fixed medium, wherein the second storage system is located remotely from the first storage system, the second storage system being associated with a second entity and configured to: store at least some of the electronic images for the plurality of financial documents, wherein the document parameter for each of the electronic images configured to be stored in the second storage system is less than or equal to the predetermined parameter. The system further comprises at least one electronic processor which has electronic access to the first and second storage systems and is also interlinked to the first storage system and the second storage system, wherein the at least one electronic processor is interlinked to the first storage system and the second storage system through at least one interlinked interface, wherein the at least one electronic processor is configured to: receive a request for at least one of the stored electronic images of the plurality of financial documents; automatically compare the numerical sequence of the document parameter associated with the requested stored electronic image to the predetermined parameter after the request is received; automatically access through the at least one interlinked interface the first storage system when the numerical sequence of the document parameter associated with the requested stored electronic image is greater than the predetermined parameter after the comparison; automatically access through the at least one interlinked interface the second storage system when the numerical sequence of the document parameter associated with the requested stored electronic image is less than or equal to the predetermined parameter after the comparison; and automatically retrieve the requested stored electronic image from the first storage system or the second storage system once the first storage system or the second storage system has been accessed.

According to various embodiments, this system may further include any one of the following features or any technically-feasible combination of these features:

the first fixed medium and the second fixed medium are different from each other;
the first fixed medium or the second fixed medium is a physical media;
the first fixed medium or the second fixed medium is a fixed electronic medium;
the first fixed medium and the second fixed medium are the same;
the at least one electronic processor is further configured to automatically reproduce the requested stored electronic image after the stored electronic image has been retrieved from the accessed storage system;
accessing the first storage system or the second storage system is further defined as accessing only one of the first storage system or the second storage system at any one time to locate the requested stored electronic image;
the at least one electronic processor which has electronic access to the first storage system and the second storage system is also interlinked to the first fixed medium and the second fixed medium;
the first entity and the second entity are associated with each other;
the second storage system is also associated with the first entity;
the at least one interlinked interface is configured to at least partially link two or more interfaces;
the at least one interlinked interface is a single interface;
the single interface is a primary interface; and/or
the first storage system is associated with a primary interface and the second storage system is associated with a secondary interface, wherein the primary interface is configured to interlink to the second storage system and the secondary interface is configured to interlink to the first storage system.

According to another embodiment, there is provided a system for selectively storing and retrieving electronic images of a plurality of financial documents, each electronic image being associated with a document parameter that includes a numerical sequence that is representative of a record date of the corresponding financial document, the system comprising: a first electronic storage means configured to: store at least some of the electronic images for the plurality of financial documents, wherein the document parameter for each of the electronic images that are configured to be stored in the first storage system is greater than a predetermined parameter, wherein the predetermined parameter is a date or time period. The system further comprises a second electronic storage means, wherein the first electronic storage means and the second electronic storage means are associated with a first entity and a second entity, respectively, wherein the first entity and the second entity are distinct or related, and wherein the second electronic storage means is configured to: store at least some of the electronic images for the plurality of financial documents, wherein the document parameter for each of the electronic images configured to be stored in the second storage system is less than or equal to the predetermined parameter. The system further comprises a retrieving means which has access to the first and second electronic storage means and is also interlinked to the first electronic storage means and the second electronic storage means, wherein the retrieving means is configured to: receive a request for at least one of the stored electronic images of the plurality of financial documents; automatically compare with the retrieving means the numerical sequence of the document parameter associated with the requested stored electronic image to the predetermined parameter after the request is received; automatically access through at least one interlinked interface the first electronic storage means when the numerical sequence of the document parameter associated with the requested stored electronic image is greater than the predetermined parameter; automatically access through the at least one interlinked interface the second storage system when the numerical sequence of the document parameter associated with the requested stored electronic image is less than or equal to the predetermined parameter; and automatically retrieve the requested stored electronic image from the first electronic storage means or the second electronic storage means depending on the document parameter associated with the requested stored electronic image.

According to various embodiments, this system may further include any one of the following features or any technically-feasible combination of these features:

the retrieving means includes an electronic processor;
the retrieving means is configured to access the at least one interlinked interface to the first and second storage systems; and/or
the first electronic storage means or the second electronic storage means is configured to digitally store the electronic images.

According to another embodiment, there is provided a method of accessing an electronically-stored financial document from one of a first storage system associated with a first entity or a second storage system associated with a second entity, wherein the second storage system is located remotely from the first storage system, wherein the first and second storage systems each include a plurality of electronic images stored therein, each of the plurality of electronic images corresponding to a plurality of financial documents, and wherein each electronic image is associated with at least one specific document parameter, wherein the specific document parameter includes a numerical sequence that is representative of a record date of the corresponding financial document, wherein the first storage system is associated with a primary interface and the second storage system is associated with a secondary interface, said method comprising the steps of: electronically storing at least some of the plurality of electronic images of the financial documents in a first fixed medium at the first storage system when the specific document parameter is greater than a predetermined parameter, wherein the predetermined parameter is a numerical record date or time period; electronically storing at least some of the plurality of electronic images of the financial documents in a second fixed medium at the second storage system when the specific document parameter is less than or equal to the predetermined parameter; utilizing at least one electronic processor that has access to the first and second storage systems by electronically interlinking the primary interface of the first storage system with the secondary interface of the second storage system; electronically receiving a request relating to one of the financial documents at the at least one electronic processor; automatically comparing with the at least one electronic processor the specific document parameter relating to the request to the predetermined parameter to determine whether the specific document parameter is greater than, less than, or equal to the predetermined parameter after the request has been received; automatically accessing through the primary interface the first storage system when the specific document parameter relating to the request is greater than the predetermined parameter and automatically accessing the second storage system through the secondary interface when the specific document parameter relating to the request is less than or equal to the predetermined parameter; and automatically retrieving the image of the requested financial document from the accessed storage system as defined by the received request.

According to various embodiments, this method may further include any one of the following features or any technically-feasible combination of these features:

the first and second fixed mediums are different from each other;
  including the step of automatically reproducing the requested financial document after the requested financial document has been retrieved from the accessed storage system;
  the step of automatically reproducing the requested financial document after the requested financial document has been retrieved from the accessed storage system includes automatically reproducing the requested financial document onto paper;
  the step of automatically reproducing the requested financial document after the requested financial document has been retrieved from the accessed storage system includes electronically reproducing the requested financial document automatically;
  the first and second storage systems are associated with the same entity;
  the first and second fixed mediums are the same;
  the step of automatically accessing the first storage system when the specific document parameter is greater than the predetermined parameter and automatically accessing the second storage system when the specific document parameter is less than or equal to the predetermined parameter utilizes an electronic processor interlinked to the first storage system and the second storage system;
  the second storage system is also associated with the first entity;
  the primary interface is also interlinked to the second storage system; and/or
  the secondary interface is also interlinked to the first storage system.

A method for a financial institution to obtain electronically-stored financial documents having a specific document parameter is disclosed. The specific document parameter is typically a particular numerical sequence, such as a record date of the financial document. The method of the subject invention enables the financial institution to obtain the financial documents from a first or an off-site storage system. The first or off-site storage system is different from a second or an on-site storage system and is preferably remotely-located from the second or on-site storage system. In one embodiment, the financial documents of the financial institution are maintained in the first or off-site storage system when the specific document parameter of the financial document is greater than a predetermined parameter. The financial documents that are less than or equal to the predetermined parameter are maintained in the second or on-site storage system. In another embodiment, the specific document parameter of the financial document that is less than or equal to the predetermined parameter is maintained in the first or off-site storage system and the financial document that is greater than the predetermined parameter is maintained in the second or on-site storage system.

When the financial institution receives a request for a financial document, the financial institution compares the specific document parameter of the requested financial document to the predetermined parameter to determine if the specific document parameter is greater than less than, or equal to the predetermined parameter. A computer terminal located at the financial institution is connected to both the off-site and on-site storage systems through a processing unit. The processing unit is utilized to, at least partially, automatically access one of the storage systems in response to the comparison of the specific document parameter to the predetermined parameter. For instance, if it is determined that the specific document parameter is less than or equal to the predetermined document parameter, then the processing unit accesses the second or on-site storage system. On the other hand, if it is determined that the specific document parameter of the financial document is greater than the predetermined parameter, then the processing unit accesses the first or off-site storage system. As stated below, the computer terminal may be used to feed a request into the processing unit.

After the requested financial document is accessed, the requested document is then retrieved in order to reproduce the financial document, and distribute the financial document to an end user of the financial institution.

The subject invention therefore provides a method that enables financial institutions to obtain electronically-stored financial documents from on-site and off-site storage systems. As such the financial institution can selectively store financial documents in either an on-site storage system or the off-site storage system, and the responsibility for the financial documents in the on-site or off-site storage systems can be outsourced to a third party entity. Further, the documents can be stored in different fixed mediums, such as microfiche, microfilm, digitally, electronically, etc., and can be stored in different geographical locations. Therefore, the back office production of the financial institution associated with the retrieval and distribution of financial documents stored in the on-site or off-site storage systems is strategically reduced or even completely eliminated.

DRAWINGS

Preferred exemplary embodiments of the invention will hereinafter be described in conjunction with the appended drawings, wherein like designations denote like elements, and wherein:

FIG. 1 is a flow diagram schematically detailing an on-site storage system, and an off-site storage system in accordance with one embodiment;

FIG. 2 is a block diagram generally representing a method for a financial institution to obtain electronically-stored financial documents from the on-site and off-site storage systems;

FIG. 3 is a block diagram completing the method of obtaining electronically-stored financial documents from the on-site storage system; and FIG. 4 is a block diagram completing the method of obtaining electronically-stored financial documents from the off-site storage system.

DESCRIPTION

Referring to the Figures, wherein like numerals indicate like or corresponding parts throughout the several views, a method for a financial institution to obtain an electronically-stored financial document is schematically shown at 10 in FIG. 1. The methods introduced herein enable the financial institution to obtain the financial document from one of a first or an off-site storage system and a second or an on-site storage system with the storage systems being different from each other. Preferably, the on-site storage system is located at the financial institution and the off-site storage system is located at a remote location distant from the financial institution. This allows the financial institution to 'outsource' the responsibilities associated with obtaining the financial document.

Methods for financial institutions to obtain electronically-stored documents are frequently used by such entities as banks, credit unions, and other financially-oriented institutions. For illustrative purposes only, the description of the subject invention is discussed with reference to banks. However, as appreciated by those skilled in the art, other businesses, such as insurance companies, may also utilize similar methods and corporate the aspects of the subject invention.

Methods for banks to obtain electronically-stored financial documents are generally used by banks to rapidly and efficiently obtain financial documents for distribution to clients upon request. As described above, the financial documents for banks are usually paid checks, checking statements, and other related financial documents, and these documents include at least one specific document parameter. As appreciated by those skilled in the art, it is not the financial document (e.g. the paid check) itself that is electronically-stored. Rather, it is data included on the document such as a sequence number that is electronically stored to look up, designate, or indicate the financial document. The specific document parameter is preferably a particular numerical sequence. As appreciated, the specific document parameter of the financial document can include, but is not limited to, a record date or age of the document, a series number, or some other document identifying number of the financial document. More specifically, in the preferred embodiment of the subject invention, the particular numerical sequence of the financial document is the record date of the financial document. That is, the date that the particular financial document was created or posted.

The financial documents are typically stored on microfiche, microfilm, digitally, or by some other electronic storage means. As appreciated, the electronic storage of the financial documents is frequently created by taking an electronic photo image of the document and storing the photo image in a computer system. One such digital electronic storage device is sold by Kodak under the name of IMAGELINK™ Digital Workstation (IDW). Electronic storage of these financial documents permits banks to eliminate storage of paper or "hard" copies of these documents. The electronic storage of these documents also provides an efficient means of retrieving the information from the on-site and off-site storage systems. This will be discussed further herein below.

As described above, the financial documents are electronically-stored in either the on-site storage system located at the bank or in the off-site storage system remotely located from the on-site storage system. More specifically, the subject invention includes the step of maintaining the financial documents in the off-site storage system when the specific document parameter of the financial document is greater than a predetermined parameter. Financial documents are maintained in the on-site storage system when the specific document parameter of the financial document is less than or equal to the predetermined parameter. As appreciated, the document parameter of the financial documents stored in the off-site storage system may be greater than or equal to the predetermined parameter with the on-site storage system having documents only less than the predetermined parameter.

Similar to the specific document parameter of the financial document, the predetermined parameter is also a numerical value. The predetermined parameter is specifically a numerical value predetermined by the bank. For instance, if the specific document parameter is a series number of a paid check and the series number is greater than the predetermined parameter which, in this case, would be an arbitrarily selected base series number, then the paid check would be stored in the off-site storage system.

In the preferred embodiment, the predetermined numerical value is a date pre-selected by the bank. For instance, the bank may pre-select a date that is one year before a current date—the current date being the actual date that the client requests the financial document. Of course, the bank may pre-select a date that is some other time period before a current date (e.g. two or three years) without varying from the scope of the present disclosure. As such, if the record date of the particular financial document is older than one year, then the particular financial document is maintained in the off-site storage system. If the record date of the particular financial document is earlier than or equal to one year, then the particular financial document is maintained in the on-site storage system. As discussed above, the document having record dates equal to the one year may be stored in the off-site or on-site storage systems.

Once the financial document is maintained in the appropriate storage system, the bank is capable of receiving a request for the financial document from the client. In reality, the client is requesting an image of the stored financial document. As appreciated, clients request the image for various reasons. As discussed above, requests are typically made for replacing lost or stolen financial documents, for tax purposes, for proof of financial transactions, for legal disputes, and other similar matters. Ultimately, the bank retrieves the image, reproduces the image, and distributes the reproduced image to the requesting client of the bank.

Referring now to FIG. 1, the method for banks to obtain electronically-stored financial documents is discussed in detail in accordance with a general scope of the subject invention. Initially the requesting client requests a particular financial document, such as a paid check. The client is typically a customer of the bank or other financial institution. The client's request is inputted into a computer terminal 11 at the financial institution. The computer terminal 11 will be discussed in more detail hereinbelow.

From the computer terminal 11, the request is fed into a processing unit 12, which is illustrated as a mainframe computer 12 at the bank. In the preferred embodiment, if the client requests a financial document having a record date earlier than or equal to one year before the current date, then the request, and other requests like it, are processed at the bank in the on-site storage system. That is, the requests are grouped together and downloaded to a downloading terminal 14 at the bank. The downloading may occur at particular intervals such as at the end of each day, every three hours, etc. The sequence number of each check requested is then determined. A document terminal 16 subsequently creates or reproduces the document, i.e., a photocopy of the check. The photocopy is then distributed to the client via facsimile, mail, or hand delivery.

It is known in the art that the majority of requests for financial documents are requests for documents which were created in the most recent year. That is, if the pre-selected date is one year before the current date, as in the preferred embodiment, then the majority of requests are seeking financial documents having a record date earlier than or equal to the pre-selected date. The remaining document requests relate to financial documents that are older than one year. Since, as described in the Background, retrieval of financial documents that are older than one year is particularly expensive, the preferred embodiment of the subject invention outsources all of the document requests which relate to documents having a record date later than one year before the current date. As appreciated, the particular time frame which is outsourced is not a critical feature of the subject invention and may be adjusted to meet the needs of any particular financial institution. In fact, all of the document requests, including the most recent, may be outsourced using an outsourcing procedure.

In the preferred embodiment, if the client requests a financial document having a record date later than one year before the current date, then the request, and others like it, are grouped together and downloaded from the mainframe computer 12 to an outsourced downloading terminal 18. As above, the downloading may be at particular intervals as needed. The sequence number is determined by a sequencing terminal 20. The sequence number is then sent back to the outsourced downloading terminal 18. An outsourced document terminal 22 then creates or reproduces the desired document which is then distributed to either the client or the bank. As appreciated, two document retrieval operations, one for the bank to retrieve financial documents having record dates earlier than or equal to one year before the current date, and another to retrieve outsourced financial documents having record dates later than one year before the current date, preferably operate simultaneously. It is to be understood that the computer terminals and the accompanying PC bases are illustrated highly schematically in FIG. 1 and are not intended to be limiting in any manner. For instance, the schematic illustration of the outsourced document terminal 22 need not include a computer terminal and an accompanying PC base. Instead, the outsourced document terminal 22 is preferably some sort of printing device.

Referring to FIGS. 2 through 4, the method for banks to obtain electronically-stored financial documents is described in even greater detail. The request is first generated by the client. The request is then processed by the bank. The processing, retrieval and reproduction of the requested financial document is typically controlled by one interlinked computer software program. One such computer software program is a software program called Antinori Software Incorporated or ASI which is sold under the name of INNOVASION™ by Carreker-Antinori of Dallas, Tex. However, other frequently used software programs include PEGA™ and Sterling™. Any of these computer software systems can provide the necessary means for implementing the discussed procedures.

The processing of the request is completed by a customer service tracking system and the computer terminal 11. The customer service tracking system assists the financial institution in receiving the request. More specifically, the customer service tracking system gives branches, customer service, and other bank departments the capability to enter, log, track, route and monitor the status of all requests for financial documents. The customer service tracking system also provides the capability to enter, log, track, route and monitor the status of customer complaints and other customer service related items.

In accordance with one contemplated embodiment, a bank employee, such as a bank teller first determines a status of the requested document. More specifically, the employee compares the specific document parameter of the requested financial document to the predetermined parameter to determine if the specific document parameter is greater than, less than, or equal to the predetermined parameter. If the specific document parameter is a particular numerical sequence and the predetermined parameter is a predetermined numerical value, then the employee compares the particular numerical sequence of the financial document to the predetermined numerical value to determine if the particular numerical sequence is greater than, less than, or equal to the predetermined numerical value. Further, if as in the preferred embodiment, the particular numerical sequence is a record date of the financial document, and the predetermined numerical value is a pre-selected date, then the employee compares the record date of the financial document to the pre-selected date to determine if the record date is later than, earlier than, or equal to the pre-selected date.

The customer service tracking system enables a bank employee, such as a bank teller, to submit the request. More specifically, the employee utilizes the computer terminal 11 located at the bank and connected to both the off-site and on-site storage systems to access one of the storage systems in response to the comparison of the specific document parameter of the requested financial document to the predetermined parameter. For instance, when the particular numerical sequence of the financial document is greater than the predetermined numerical value, the employee preferably utilizes the computer terminal 11 to access the off-site storage system, and when the particular numerical sequence of the financial document is less than or equal to the predetermined numerical value, the employee preferably utilizes the computer terminal 11 to access the on-site storage system. As discussed above, the documents have a numerical sequence equal to the predetermined numerical value may be stored in either the off-site or on-site storage systems.

After the computer terminal 11 is utilized to access the desired storage system, the employee manually inputs identification data of the requested financial document into the computer terminal 11. More specifically, when the particular numerical sequence of the financial document is less than or equal to the predetermined numerical value, the employee inputs identification data into a primary interface and selects the requested document. Also, the primary interface preferably provides an option for the employee to select among several different output formats. The primary interface is inter-linked with the on-site storage system. In the preferred embodiment of the subject invention, the primary interface appears as follows and includes the identification data detailed below:

---

Account Number:                         Prod Type:
Account Name:                           Customer Code:
  Address:
  City:                    State:       Zip Code:
Home Phone: ( )                         Work Phone: ( )
Fax: ( )
Service Code:
For Items Posted Within A Year
Copy of Statement Only                  Savings Items
Copy of Check/Deposit Ticket            Misc (G/L, Loans, Teller, Etc)
Check(s)/Deposit(s) <30 Items           Cash Letter Reconstruction
Statements and <30 Items                Lockbox
Statements and >30 Items                Legal Statement Only
Deposit Reconstruction                  Legal Statement and Items
Regardless of Posting Date
Missing Transactions            Returned Items
Online (Backdated/Unposted)Encoding Error/Wrong Account
EXIT FUNCTION

---

Alternatively, when the particular numerical sequence of the financial document is greater than the predetermined numerical value, the employee selects an exit function at the primary interface. The exit function distinguishes that the request is to be sent to an outsourcing third party entity. Upon selection of the exit function at the primary interface, a secondary interface, inter-linked with the exit function, is initiated. The secondary interface is inter-linked with the off-site storage system. The employee inputs identification data into the secondary interface and selects the requested document. Also, the secondary interface preferably provides an option for the employee to select among several different output formats. Preferably, routing, or service codes will be generated automatically upon the initiation of the secondary interface and the inputting of the identification data into the secondary interface. The routing codes enable the bank to recognize that the request is being sent to the outsourced third party entity. Furthermore, the routing codes are configured to automatically forward the inputted identification data to the off-site storage system. The inputted identification data and the routing codes are forwarded into the mainframe computer 12 introduced above for temporary storage before transfer to the off-site storage system. This temporary storage also serves to defend against unexpected power outages, computer malfunctions, and the like. In the preferred embodiment of the subject invention, the secondary interface appears as follows and includes the identification data detailed below:

---

Account Number:                         Prod Type:
Account Name:                           Customer Code:
  Address:
  City:                    State:       Zip Code:
Home Phone: ( )                         Work Phone: ( )
Fax: ( )
Service Code:
For items Posted Prior to a Year
Copy of Statement Only                  Savings Items
Copy of Check/Deposit Ticket            Misc (G/L, Loans, Teller, Etc)
Check(s)/Deposit(s) <30 Items           Cash Letter Reconstruction
Statements and <30 Items                Lockbox
Statements and >30 Items                Legal Statement Only
Deposit Reconstruction                  Legal Statement and Items

---

Once the bank employee has inputted the necessary identification data into either the Primary or secondary interface, then retrieval of the financial document can continue. Specifically, the requested financial document is retrieved as defined by the inputted identification data. Two separate document retrieval procedures are discussed hereinbelow. One document retrieval procedure is for the financial documents having a record date earlier than or equal to the pre-selected date-one year before the current date in this example. The other document retrieval procedure is for the financial documents having a record date later than the pre-selected date. As discussed above, the one year timing selected for the pre-selected date is simply shown as an example and any suitable time frame may be utilized. In fact, even all financial document retrievals may be outsourced to the third party entity. As also discussed above, the two separate document retrieval procedures will typically operate simultaneously.

With reference to the subject example, if the record date of the financial document is earlier than or equal to one year before the current date, the remaining steps occur at the bank. As discussed above, these steps are known as the back office production of the bank. The request is first categorized by a research automation system. The research automation system automates the entire workflow of a bank's research and photocopy departments by sending requests to the appropriate sequence for processing. The downloading terminal 14 serves to perform the research automation system's tasks.

Photocopy requests are routed to an image control system, statement requests are sent to a document retrieval system, and requests for financial adjustments are routed to an adjustment system. The document terminal 16 serves to perform these tasks. In the illustrated embodiment of the subject invention, the sample document request is for a paid check. Hence, the categorized sequence will be the image control system which handles photocopy requests.

Referring now to FIG. 3, after the request is categorized, the request is verified for completeness and accuracy. If the request is not complete then additional data is retrieved. The additional data is retrieved by using a sequence number retrieval system and/or an all items research system. Once the request is complete and accurate, then the image reference number can be determined. That is, once the request is complete and accurate, then the requested financial document can be electronically located in the on-site storage system. The reference number may be a routing, sequence, or any other type of indicator. The reference number is determined by the image control system. The image control system is an image retrieval and routing management system which works in conjunction with Kodak's IMAGELINK™ Digital Workstations (IDW). Specifically, the image control system first connects to a network node. The network node is any type of storage device as is known in the art. Preferably a Kodak network node is used. The network node drives the IDW to find the location of the image by using the reference number. Specifically, the employee is prompted to verify that the correct media is loaded in the IDW such that the IDW can locate the image. The reference number for the document is known and the document image is now verified and located.

The requested image can now be retrieved and reproduced. In other words, a copy of the digitized document (the check) is created. The copy may be created by manually pulling the microfilm, microfiche, or the like and photocopying the document. The copy may also be made by printing the document from a digitized record. The photocopy of the check is then distributed to the requesting client or other end user of the financial institution. Other end users of the financial institution include, but are not limited to, other financial institutions and federal and state governments. Additional information such as a photocopy report, a statement of charges, a research report and/or a daily status report may also be produced for the requesting client, the other end user, and/or the financial institution. The document retrieval system incorporated at the bank and the method for obtaining electronically-stored financial documents from the on-site storage system is now completed.

Continuing with the subject example, if the record date of the financial document is later than one year before the current date, the automated retrieval of the financial document is outsourced to the third party entity. To begin, a separate file is automatically generated at the bank by the input of the identification data into the secondary interface. Referring specifically to FIG. 4, the routing codes direct the request created on the separate file to be routed separately to the outsourced third party entity. In the preferred embodiment of the subject invention, additional user ID's are created to allow only selected users into the secondary interface. The identification data stored in the separate file and the routing codes are downloaded to the off-site storage system for retrieval of the requested financial documents by the outsourced downloading terminal 18. Preferably, the identification data and routing codes are grouped into batches of common requests for optimum retrieval of the requested financial document by the outsourced third party entity at the off-site storage system. The downloading step may occur at any suitable predetermined interval. Preferably, the downloading will occur three times a day. The downloaded documents are known in the industry as a basket of requests.

The subject method further includes the step of creating a back-up file of the downloaded identification data and routing codes in the off-site storage system. The back-up file acts as an emergency information source in case the mainframe computer 12 at the financial institution has a catastrophic failure. In addition, the outsourced third party entity is in direct connection with the mainframe computer 12 of the bank wherein the outsourced third party entity may produce a backup directory of each database file. This database backup is an additional safe guard for the financial institution.

The downloaded identification data and routing codes are then categorized for processing in the off-site storage system. The research automation system categorizes this information in a like fashion as discussed above. In fact, the outsourced third party entity uses the same computer software package as the financial institution such that the flow of information is optimum and not interrupted. As discussed above, the subject example request is for a paid check. Hence, the request will be categorized into the image control system and a sequence number will be determined by the sequencing terminal 20. Also, a status to update the progress of the requested financial document is provided to the financial institution.

After the request is categorized, the request, specifically the inputted identification data, is verified for completeness and accuracy. If the request is not complete or accurate, then additional data is retrieved. In a similar fashion as above, the additional data is retrieved by using the sequence number retrieval system and/or the all items research system. As appreciated, the outsourced third party entity may retrieve this information from the mainframe computer 12, via its direct line, or from its own backup database files. Once the request is complete and accurate, the image reference number can be determined. Again, as above, the reference number is determined by the image control system.

The requested image is then retrieved. More specifically, the requested financial document is electronically located in the off-site storage system. Additionally, the requested financial document is also reproduced after the document is electronically located in the off-site storage system by the outsourced document terminal 22. In other words, a copy of the digitized document (the cheek) is created. A status file is then created for the completed transaction. Also, a status of the request is sent to the financial institution wherein the institution may update their records. The status updates, as well as the information connections, create a two way information exchange between the outsourced third party entity and the bank.

The photocopy of the check is then distributed or digitally transferred to the requesting client, the financial institution, or other end users of the financial institution. In the preferred embodiment of the subject invention, the photocopy of the request is distributed to the requesting client, etc. based on the routing codes. That is, in addition to directing the request to be separately routed to the outsourced third party entity, the routing codes also indicate an appropriate distribution for the request client or other end user. The request is now completed.

A special circumstance occurs when the record date of one portion of the client's request is earlier than or equal to one year before the current date, and when the record date of another portion of the client's request is later than one year before the current date. These types of requests are known in the industry as spanned requests. One solution is to incorporate an additional interface utilized when the employee of the bank is utilizing the computer terminal 11 and comparing the specific document parameter of the requested financial document to the predetermined parameter to determine if the specific document parameter is greater than, less than, or equal to the predetermined parameter. If the request is a spanned request, then the request will be split into two separate requests which can be handled simultaneously. A special notation would be put onto the requests such that they may be put back together before distributing the documents to the client or other end user. Another solution simply notifies the inputting employee that two requests should be entered separately. A third solution sends the request to the back office production at the bank wherein the back office employees notify the outsourced third party entity by a separate request to retrieve the requested financial documents.

One or more embodiments of the invention have been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, wherein reference numerals are merely for convenience and are not to be in any way limiting, the invention may be practiced otherwise than as specifically described.

Further, it is to be understood that the foregoing is a description of one or more preferred exemplary embodiments of the invention. The invention is not limited to the particular embodiment(s) disclosed herein, but rather is defined solely by the claims below. Moreover, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A system for selectively storing and retrieving electronic images of a plurality of financial documents, each electronic image being associated with a document parameter that includes a numerical sequence that is representative of a record date of the corresponding financial document, the system comprising:
   a first storage system including a first fixed medium, the first storage system being associated with a first entity and configured to:
      store at least some of the electronic images for the plurality of financial documents, wherein the document parameter for each of the electronic images that are configured to be stored in the first storage system is greater than a predetermined parameter, wherein the predetermined parameter is a date or time period;
   a second storage system including a second fixed medium, wherein the second storage system is located remotely from the first storage system, the second storage system being associated with a second entity and configured to:
      store at least some of the electronic images for the plurality of financial documents, wherein the document parameter for each of the electronic images configured to be stored in the second storage system is less than or equal to the predetermined parameter;
   at least one electronic processor which has electronic access to the first and second storage systems and is also interlinked to the first storage system and the second storage system, wherein the at least one electronic processor is interlinked to the first storage system and the second storage system through at least one interlinked interface, wherein the at least one electronic processor is configured to:
      electronically receive a request for at least one of the stored electronic images of the plurality of financial documents;
      automatically, without human intervention, compare the numerical sequence of the document parameter associated with the requested stored electronic image to the predetermined parameter after the request is received;
      automatically access through the at least one interlinked interface the first storage system when the numerical sequence of the document parameter associated with the requested stored electronic image is greater than the predetermined parameter after the comparison;
      automatically access through the at least one interlinked interface the second storage system when the numerical sequence of the document parameter associated with the requested stored electronic image is less than or equal to the predetermined parameter after the comparison; and
      automatically retrieve the requested stored electronic image from the first storage system or the second storage system once the first storage system or the second storage system has been accessed.

2. The system as set forth in claim 1, wherein the first fixed medium and the second fixed medium are different from each other.

3. The system as set forth in claim 1, wherein the first fixed medium or the second fixed medium is a physical media.

4. The system as set forth in claim 1, wherein the first fixed medium or the second fixed medium is a fixed electronic medium.

5. The system as set forth in claim 1, wherein the first fixed medium and the second fixed medium are the same.

6. The system as set forth in claim 1, wherein the at least one electronic processor is further configured to automatically reproduce the requested stored electronic image after the stored electronic image has been retrieved from the accessed storage system.

7. The system as set forth in claim 1, wherein accessing the first storage system or the second storage system is further defined as accessing only one of the first storage system or the second storage system at any one time to locate the requested stored electronic image.

8. The system as set forth in claim 1, wherein the at least one electronic processor which has electronic access to the first storage system and the second storage system is also interlinked to the first fixed medium and the second fixed medium.

9. The system as set forth in claim 1, wherein the first entity and the second entity are associated with each other.

10. The system as set forth in claim 1, wherein the second storage system is also associated with the first entity.

11. The system as set forth in claim 1, wherein the at least one interlinked interface is configured to at least partially link two or more interfaces.

12. The system as set forth in claim 1, wherein the at least one interlinked interface is a single interface.

13. The system as set forth in claim 12, wherein the single interface is a primary interface.

14. The system as set forth in claim 1, wherein the first storage system is associated with a primary interface and the second storage system is associated with a secondary interface, wherein the primary interface is configured to interlink to the second storage system and the secondary interface is configured to interlink to the first storage system.

15. A system for selectively storing and retrieving electronic images of a plurality of financial documents, each electronic image being associated with a document parameter that includes a numerical sequence that includes a representation of a record date of the corresponding financial document, the system comprising:
  a first electronic storage means configured to:
    store at least some of the electronic images for the plurality of financial documents, wherein the document parameter for each of the electronic images that are configured to be stored in the first storage system is greater than a predetermined parameter, wherein the predetermined parameter is a date or time period;
  a second electronic storage means, wherein the first electronic storage means and the second electronic storage means are associated with a first entity and a second entity, respectively, wherein the first entity and the second entity are distinct or related, and wherein the second electronic storage means is configured to:
    store at least some of the electronic images for the plurality of financial documents, wherein the document parameter for each of the electronic images configured to be stored in the second storage system is less than or equal to the predetermined parameter;
  a retrieving means which has access to the first and second electronic storage means and is also interlinked to the first electronic storage means and the second electronic storage means, wherein the retrieving means is configured to:
    electronically receive a request for at least one of the stored electronic images of the plurality of financial documents;
    automatically compare with the retrieving means the numerical sequence of the document parameter associated with the requested stored electronic image to the predetermined parameter after the request is received;
    automatically access through at least one interlinked interface the first electronic storage means when the numerical sequence of the document parameter associated with the requested stored electronic image is greater than the predetermined parameter;
    automatically access the second storage system through the at least one interlinked interface when the numerical sequence of the document parameter associated with the requested stored electronic image is less than or equal to the predetermined parameter; and
    automatically retrieve the requested stored electronic image from the first electronic storage means or the second electronic storage means depending on the document parameter associated with the requested stored electronic image.

16. The system as set forth in claim 15, wherein the retrieving means includes one or more electronic processors.

17. The system as set forth in claim 15, wherein the retrieving means is configured to access the at least one interlinked interface to the first and second storage systems.

18. The system as set forth in claim 15, wherein the first electronic storage means or the second electronic storage means is configured to digitally store the electronic images.

19. A method of accessing an electronically-stored financial document from one of a first storage system associated with a first entity or a second storage system associated with a second entity, wherein the second storage system is located remotely from the first storage system, wherein the first and second storage systems each include a plurality of electronic images stored therein, each of the plurality of electronic images corresponding to a plurality of financial documents, and wherein each electronic image is associated with at least one specific document parameter, wherein the specific document parameter includes a numerical sequence that contains information relating to a record date of the corresponding financial document, wherein the first storage system is associated with a primary interface and the second storage system is associated with a secondary interface, said method comprising the steps of:
  electronically storing at least some of the plurality of electronic images of the financial documents in a first fixed medium at the first storage system when the specific document parameter is greater than a predetermined parameter, wherein the predetermined parameter is a numerical record date or time period;
  electronically storing at least some of the plurality of electronic images of the financial documents in a second fixed medium at the second storage system when the specific document parameter is less than or equal to the predetermined parameter;
  utilizing at least one electronic processor that has access to the first and second storage systems by electronically interlinking the primary interface of the first storage system with the secondary interface of the second storage system;
  electronically receiving a request relating to one of the financial documents at the at least one electronic processor;
  automatically comparing with the at least one electronic processor the specific document parameter relating to the request to the predetermined parameter to determine whether the specific document parameter is greater than, less than, or equal to the predetermined parameter after the request has been received;
  automatically accessing through the primary interface the first storage system when the specific document parameter relating to the request is greater than the predetermined parameter and automatically accessing the second storage system through the secondary interface when the specific document parameter relating to the request is less than or equal to the predetermined parameter; and
  automatically retrieving the image of the requested financial document from the accessed storage system as defined by the received request.

20. The method as set forth in claim 19, wherein the first and second fixed mediums are different from each other.

21. The method as set forth in claim 19, further including the step of automatically reproducing the requested financial document after the requested financial document has been retrieved from the accessed storage system.

22. The method as set forth in claim 21, wherein the step of automatically reproducing the requested financial document after the requested financial document has been retrieved from the accessed storage system includes automatically reproducing the requested financial document onto paper.

23. The method as set forth in claim 21, wherein the step of automatically reproducing the requested financial document after the requested financial document has been retrieved from the accessed storage system includes electronically reproducing the requested financial document automatically.

24. The method as set forth in claim 19, wherein the first and second storage systems are associated with the same entity.

25. The method as set forth in claim 19, wherein the first and second fixed mediums are the same.

26. The method as set forth in claim 19, wherein the step of automatically accessing the first storage system when the specific document parameter is greater than the predetermined parameter and automatically accessing the second storage system when the specific document parameter is less than or equal to the predetermined parameter utilizes at least one electronic processor interlinked to the first storage system and the second storage system.

27. The method as set forth in claim 19, wherein the second storage system is also associated with the first entity.

28. The method as set forth in claim 19, wherein the primary interface is also interlinked to the second storage system.

29. The method as set forth in claim 19, wherein the secondary interface is also interlinked to the first storage system.

\* \* \* \* \*